(12) United States Patent
Buczek et al.

(10) Patent No.: US 10,608,941 B2
(45) Date of Patent: Mar. 31, 2020

(54) DUAL-NETWORK FOR FAULT TOLERANCE

(71) Applicant: NIO USA, Inc., San Jose, CA (US)

(72) Inventors: Joseph Buczek, San Jose, CA (US);
Joseph William Long, Oceanside, CA (US)

(73) Assignee: NIO USA, Inc., San Jose, CA (US)

( * ) Notice: Subject to any disclaimer, the term of this patent is extended or adjusted under 35 U.S.C. 154(b) by 41 days.

(21) Appl. No.: 15/717,179

(22) Filed: Sep. 27, 2017

(65) Prior Publication Data

US 2019/0097932 A1    Mar. 28, 2019

(51) Int. Cl.

| | |
|---|---|
| *H04L 12/803* | (2013.01) |
| *H04L 29/08* | (2006.01) |
| *H04L 29/06* | (2006.01) |
| *H04L 12/801* | (2013.01) |
| *H04L 29/14* | (2006.01) |
| *B60W 30/00* | (2006.01) |
| *H04L 12/413* | (2006.01) |

(Continued)

(52) U.S. Cl.
CPC .......... *H04L 47/122* (2013.01); *B60W 30/00* (2013.01); *H04L 12/413* (2013.01); *H04L 47/11* (2013.01); *H04L 67/12* (2013.01); *H04L 69/14* (2013.01); *H04L 69/18* (2013.01); *H04L 69/40* (2013.01); *H04L 12/40* (2013.01); *H04L 47/12* (2013.01); *H04L 63/0876* (2013.01); *H04L 2012/40215* (2013.01); *H04W 12/00512* (2019.01)

(58) Field of Classification Search
CPC ....... H04L 47/11; H04L 47/122; H04L 67/12; H04L 69/18; H04L 2012/40215; H04L 12/40; H04L 12/413; H04L 47/12; H04L 63/0876; H04L 69/14; H04L 69/40; H04W 12/00512; B60W 30/00; B60W 2030/00

See application file for complete search history.

(56) References Cited

U.S. PATENT DOCUMENTS

| | | | |
|---|---|---|---|
| 6,101,545 A | * | 8/2000 | Balcerowski ........... H04L 29/06 370/464 |
| 6,507,810 B2 | | 1/2003 | Razavi et al. |
| 8,099,179 B2 | | 1/2012 | Naik et al. |

(Continued)

OTHER PUBLICATIONS

International Search Report and Written Opinion for International (PCT) Patent Application No. PCT/US18/51701, dated Nov. 26, 2018, 10 pages.

*Primary Examiner* — Asad M Nawaz
*Assistant Examiner* — Thomas R Cairns
(74) *Attorney, Agent, or Firm* — Sheridan Ross P.C.

(57) ABSTRACT

Embodiments herein relate to a vehicle, including a first plurality of devices associated with a first vehicle function and a second plurality of devices associated with a second vehicle function. The first communication network communicatively couples each of the first plurality of devices to each other, communicatively couples each of the second plurality of devices to each other, and communicatively couple the first plurality of devices to the second plurality of devices. Further, a second communication network communicatively couples less than all of the first plurality of devices to less than all of the second plurality of devices, where the second communication network transmits messages determined to be critical from a first device of the first plurality of devices to a first device of the second plurality of devices.

13 Claims, 13 Drawing Sheets

(51) Int. Cl.
*H04L 12/40* (2006.01)
*H04W 12/00* (2009.01)

(56) References Cited

U.S. PATENT DOCUMENTS

| | | | |
|---|---|---|---|
| 8,116,205 B2 | 2/2012 | Reinold et al. | |
| 8,194,536 B2 | 6/2012 | Reinold et al. | |
| 8,731,773 B2* | 5/2014 | Yousefi | H04N 7/183 |
| | | | 701/36 |
| 9,969,329 B2* | 5/2018 | Shenoy | B60Q 9/008 |
| 10,469,408 B2* | 11/2019 | Yousefi | H04B 1/3822 |
| 2002/0101365 A1 | 8/2002 | Flick | |
| 2006/0253726 A1 | 11/2006 | Kukshya et al. | |
| 2008/0161986 A1 | 7/2008 | Breed | |
| 2013/0311009 A1 | 11/2013 | McAndrew et al. | |
| 2014/0200760 A1 | 7/2014 | Kaufmann et al. | |
| 2017/0176192 A1 | 6/2017 | Cardoso de Moura | |

\* cited by examiner

DUAL-NETWORK FOR FAULT TOLERANCE

FIELD

The present disclosure is generally directed to vehicle communication systems, in particular, toward electric and/or hybrid-electric vehicle communication systems.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented via a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, support infrastructure, and critical safety features.

DETAILED DESCRIPTION

Embodiments of the present disclosure will be described in connection with a vehicle and, in some embodiments, an electric vehicle, rechargeable electric vehicle, and/or hybrid-electric vehicle and associated systems.

Figure 1:
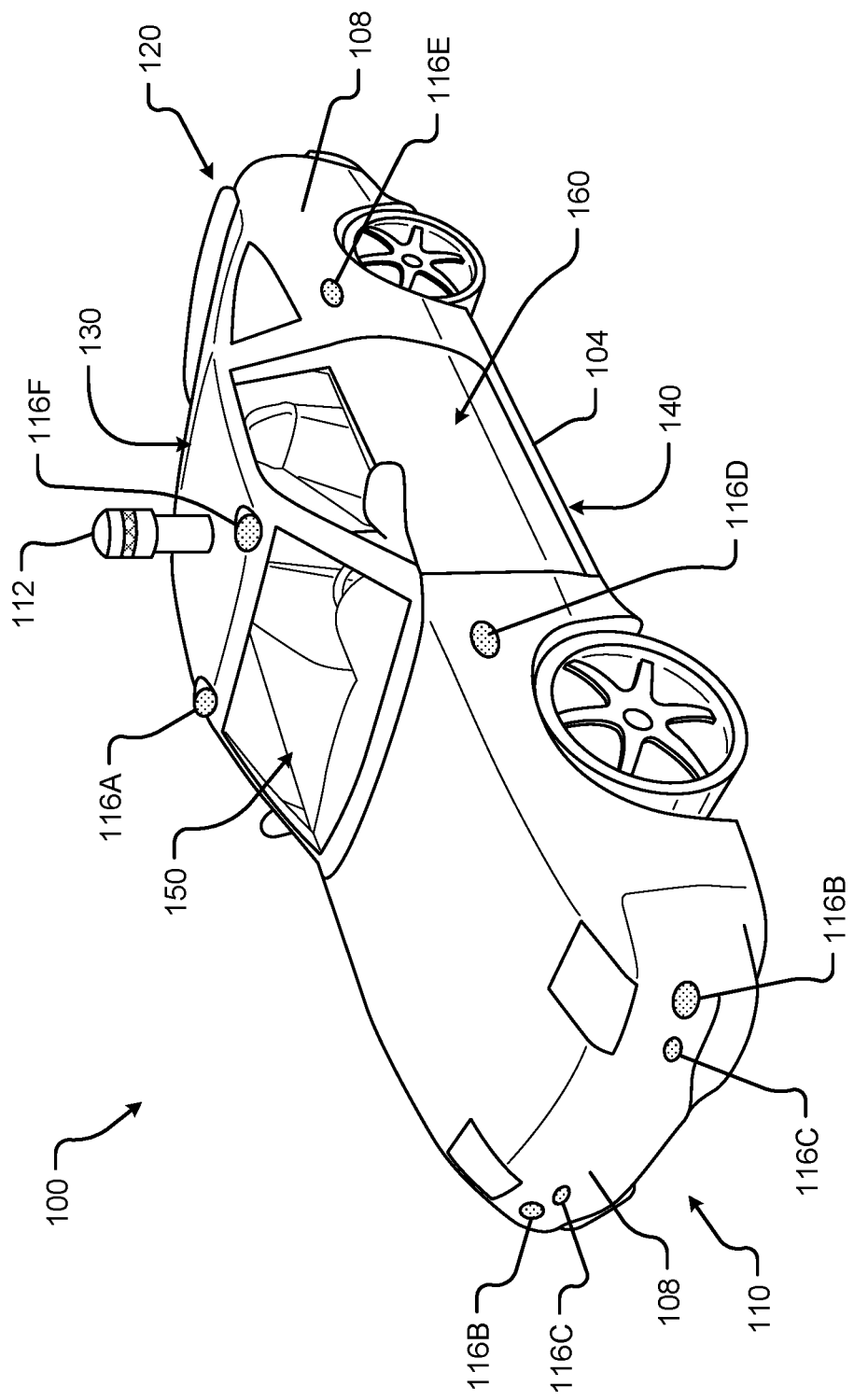
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include, but are in no way limited to, cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
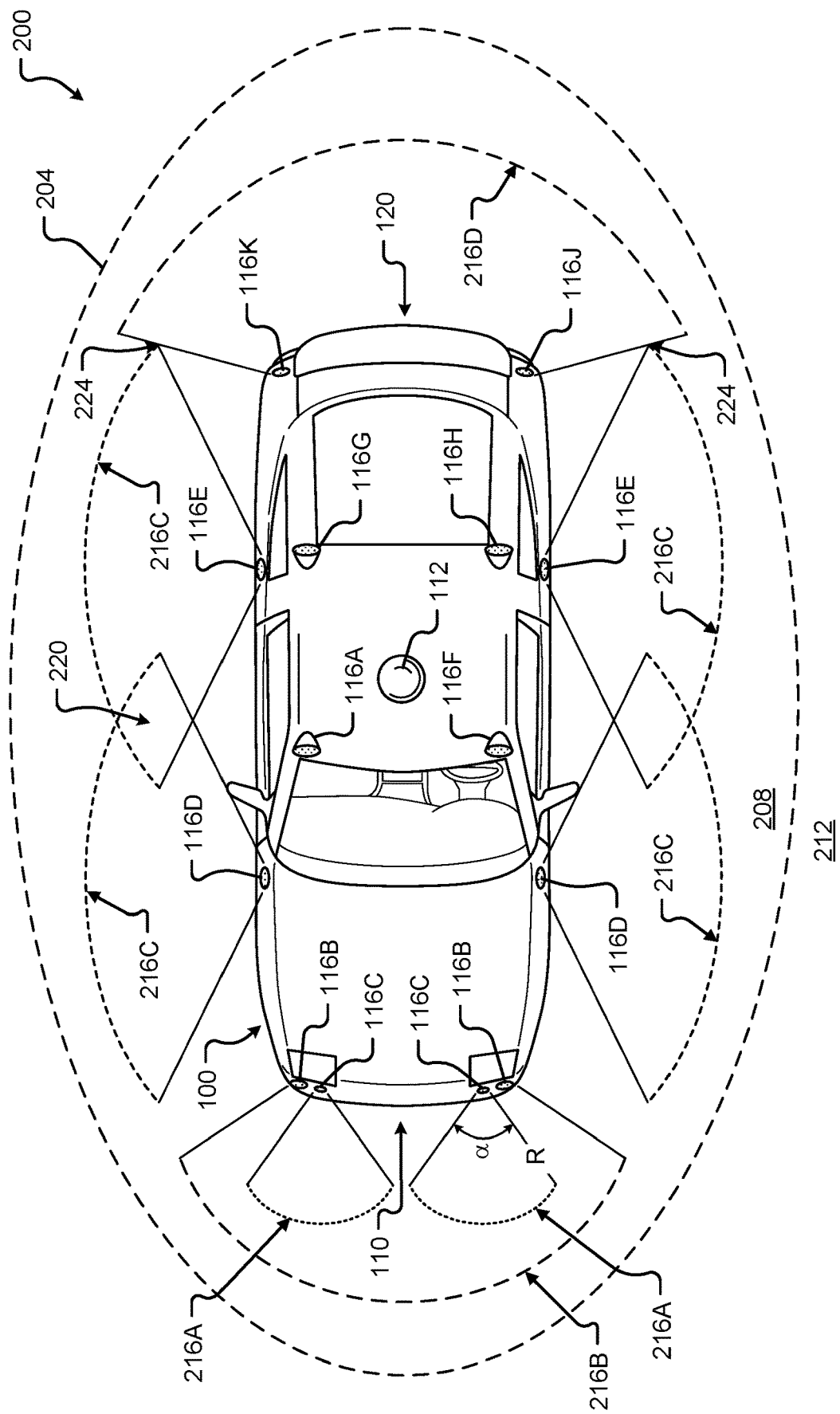
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction of the vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear 120 of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
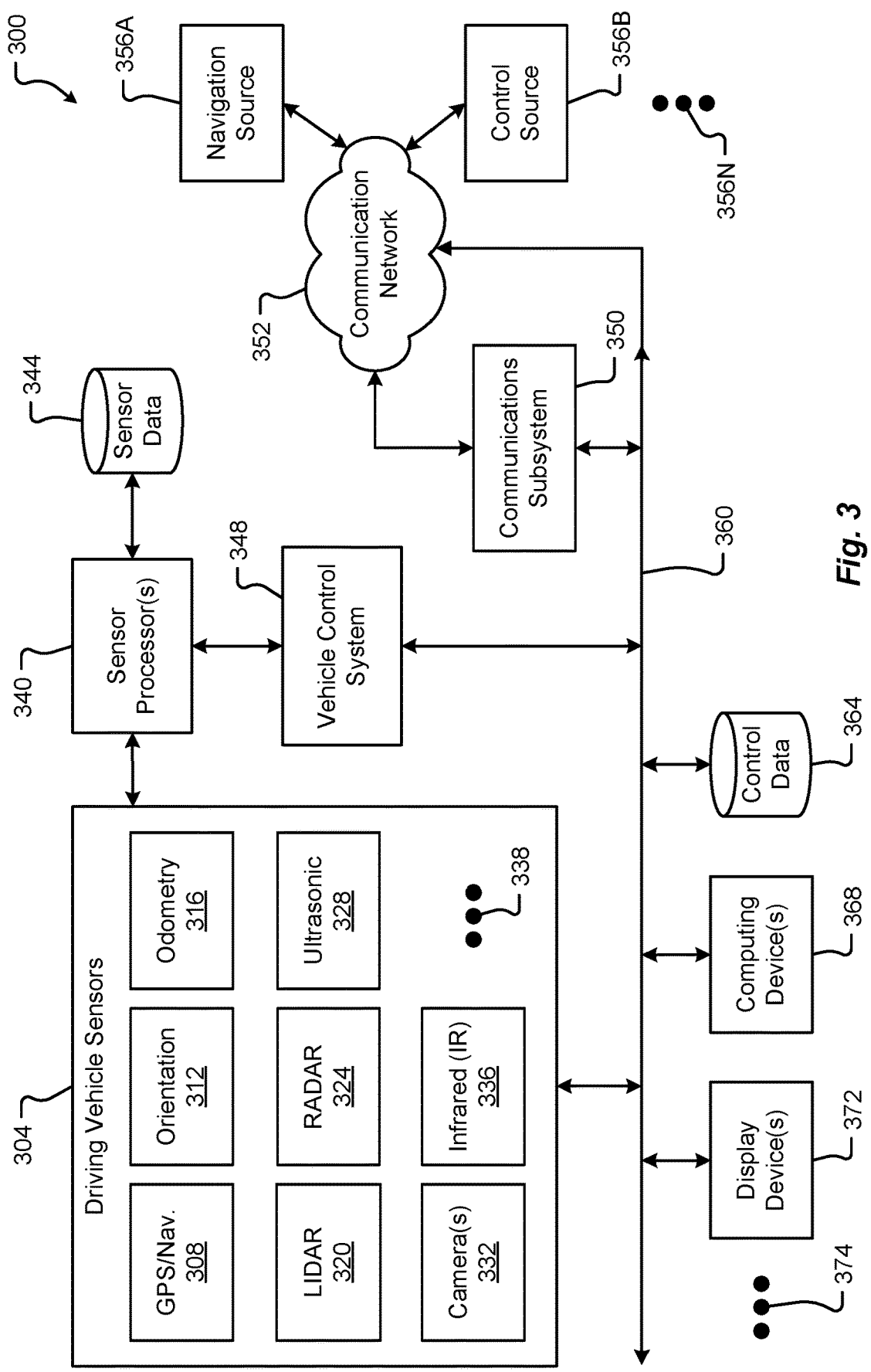
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus and/or communication network 360. In some embodiments, the one or more associated components may send and/or receive signals and/or other information across a communication network 352 to at least one of a navigation source 356A, a control source 356B, or some other entity 356N.

In accordance with at least some embodiments of the present disclosure, the communication network 352 and/or communication network 360 may comprise any type of known communication medium or collection of communication media and may use any type of protocols, such as SIP, TCP/IP, SNA, IPX, AppleTalk, and the like, to transport messages between endpoints. The communication network 352 and/or communication network 360 may include wired and/or wireless communication technologies. The Internet is an example of the communication network 352 and/or communication network 360 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 and/or communication network 360 may comprise a number of different communication media such as coaxial cable, copper cable/wire, fiber-optic cable, antennas for transmitting/receiving wireless messages, and combinations thereof. The communication network 352 and/or communication network 360 may further included one or more redundant communication pathways, dedicated communication pathways, or the like, as will be described later.

Alternatively, or in addition, the communication network 352 and/or communication network 360 may include a dedicated short range communication (DSCR) system that enables vehicle-to-vehicle (V2V) communication. DSRC (Dedicated Short Range Communications) provides two-way short-to-medium-range wireless communications capability that permits very high data transmission critical in communications-based active safety applications. In Report and Order FCC-03-324, incorporated herein by reference, the Federal Communications Commission (FCC) allocated 75 MHz of spectrum in the 5.9 GHz band for use by Intelligent Transportations Systems (ITS) vehicle safety and mobility applications. DSRC and other wireless communications technologies help to ensure safe, interoperable connectivity to help prevent vehicular crashes of all types and to enhance mobility and environmental benefits across all transportation system modes. Vehicle safety applications that use vehicle-to-vehicle (V2V) and vehicle-to-infrastructure (V2I) communications may utilize a secure, wireless interface that is dependable in extreme weather conditions and has short time delays facilitated by DSRC. The communication network 352 and/or communication network 360 may be interoperable with protocols related to 802.11p and/or DSRC.

The communication network 352 and/or communication network 360 may not require high bandwidth forms of communication; however, the communication network 352 may require, or place great emphasis on, low latency (e.g. <1 ms) forms of communication to control a vehicle in motion. Therefore, the communication network 352 and/or communication network 360 would need to provide data with a command response time being close to zero; such response time would be important for the safe operation of vehicles if V2V applications are being utilized. Thus, the communication network 352 and/or communication network 360 may utilize one or more networks implementing 5G. As a fully 'driverless' car would need to be driverless in all geographies, full road network coverage with 100% reliability to be a critical element in a driverless car implementation.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture. Further, the radar sensors 324 may employ Short Range Radar (SRR) technology operating at 24 GHz and/or multi-range radar (MRR) operating at 79 GHz. The 79 GHz radar enables the detection of pedestrians and the like around vehicles which have proved to be more difficult to be detect by 77 GHz band radar.

The radar sensor(s) 324 may be capable of operating at the four major frequency bands allocated for radar applications, each of which may be divided into two sub-categories: 24-GHz band and 77-GHz band. The 24-GHz band consists of two bands, one around 24.125 GHz with a bandwidth of around 200 MHz and, the other around 24 GHz with a bandwidth of 5 GHz. Both of these bands may be used for short/mid-range radars. The 77-GHz band also consists of two sub-bands, 76-77 GHz for narrow-band long-range radar and 77-81 GHz for short-range wideband radar. As frequency increases, smaller antenna size may be employed and higher angular resolution may be achieved. Furthermore, by increasing the carrier frequency, the Doppler frequency also increases proportional to the velocity of the target; hence by using mm-wave frequencies, a higher speed resolution can be achieved. Range resolution depends on the modulated signal bandwidth, thus wideband radars can achieve a higher range resolution, which is required in short-range radar applications. By using the 77-GHz band for long-range and short-range applications, the same semiconductor technology solutions may be used in the implementation of both of them. Also, higher output power is allowed in this band, as compared to the 24-GHz radar band.

76-77-GHz and 77-81-GHz radar sensors together are capable of satisfying the requirements of automotive radar systems including short-range and long-range object detection. For short-range radar applications, the resolution may be high; as a result, a wide bandwidth is required. Therefore, the 77-81-GHz band is allocated for short-range radar (30-50m). For long-range adaptive cruise control, a lower resolution is sufficient; as a result, a narrower bandwidth can be used. The 76-77-GHz is allocated for this application.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle 100, sending commands to one or more computing devices 368 associated with the vehicle 100, and/or controlling a driving operation of the vehicle 100. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment. Moreover, the vehicle control system 348 may communicate utilizing one or more dedicated and/or redundant communication pathways as previously mentioned. In accordance with embodiments of the present disclosure, a fault-tolerant backup network that ensures that safety-critical messages arrive at their destinations without additional latency, network congestion, and/or other forms of delay, or the possibility that inter-vehicle routing devices, such as a router, provide a fault choke-point. Thus, by utilizing a disparate network protocol, a system-wide fault affecting one network and/or network protocol would not impair the other network and/or network protocol.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356B may provide vehicle control information including autonomous driving control commands, vehicle operation override control commands, and the like. As previously mentioned, such commands may be routed over a fault-tolerant backup network and/or a dedicated network to ensure that safety-critical messages arrive at their destination without intervening routers or switches potentially contributing to a point of failure. Alternatively, or in addition, such commands may be routed over a fault-tolerant backup network and/or a dedicated network to ensure that safety-critical messages arrive at their destination without additional latency, network congestion, and/or other forms of delay. The control source 356B may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356B across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
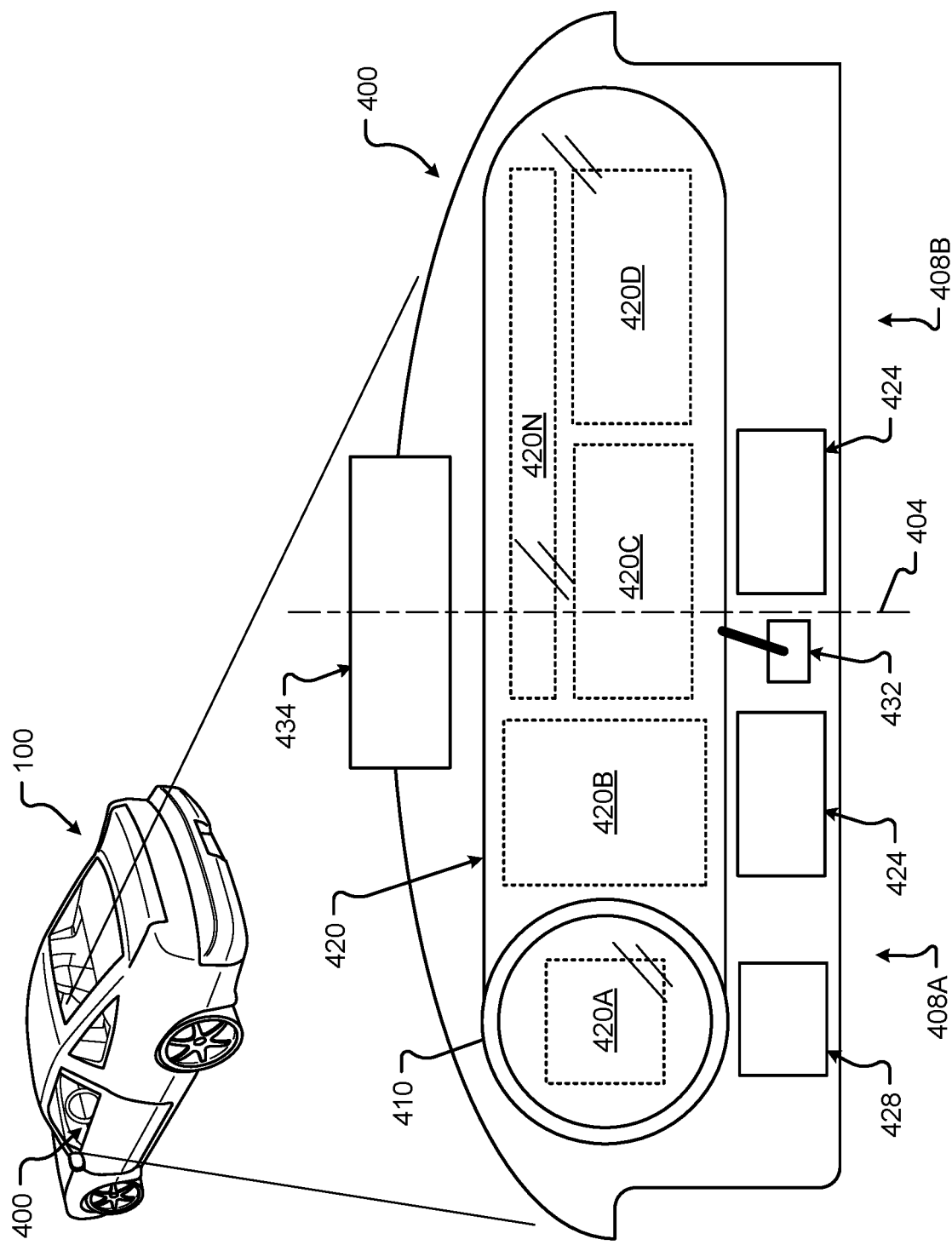
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of the instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel 400.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

In accordance with at least one embodiment of the present disclosure, during normal operation, the vehicle instrument panel 400 may utilize a first network protocol and/or first network, such as Ethernet, to exchange control, data, and status messages among one or more modules as well as other modules in other systems, as will be discussed in further detail with respect to FIG. 6. For safety-critical event messages, such communication between modules communicating safety-critical event messages and the specific recipient modules would also be transmitted utilizing the other, or second, network protocol and/or network, such as a CAN network, to ensure that no failed device on either network could delay or prevent delivery of the safety-critical messages. In accordance with at least one embodiment of the present disclosure, communication between modules communicating safety-critical event messages and the specific recipient modules would be transmitted only utilizing the other, or second, network protocol and/or network, such as a CAN network, to ensure that no failed device on the first network could delay or prevent delivery of the safety-critical messages.

Figure 5:
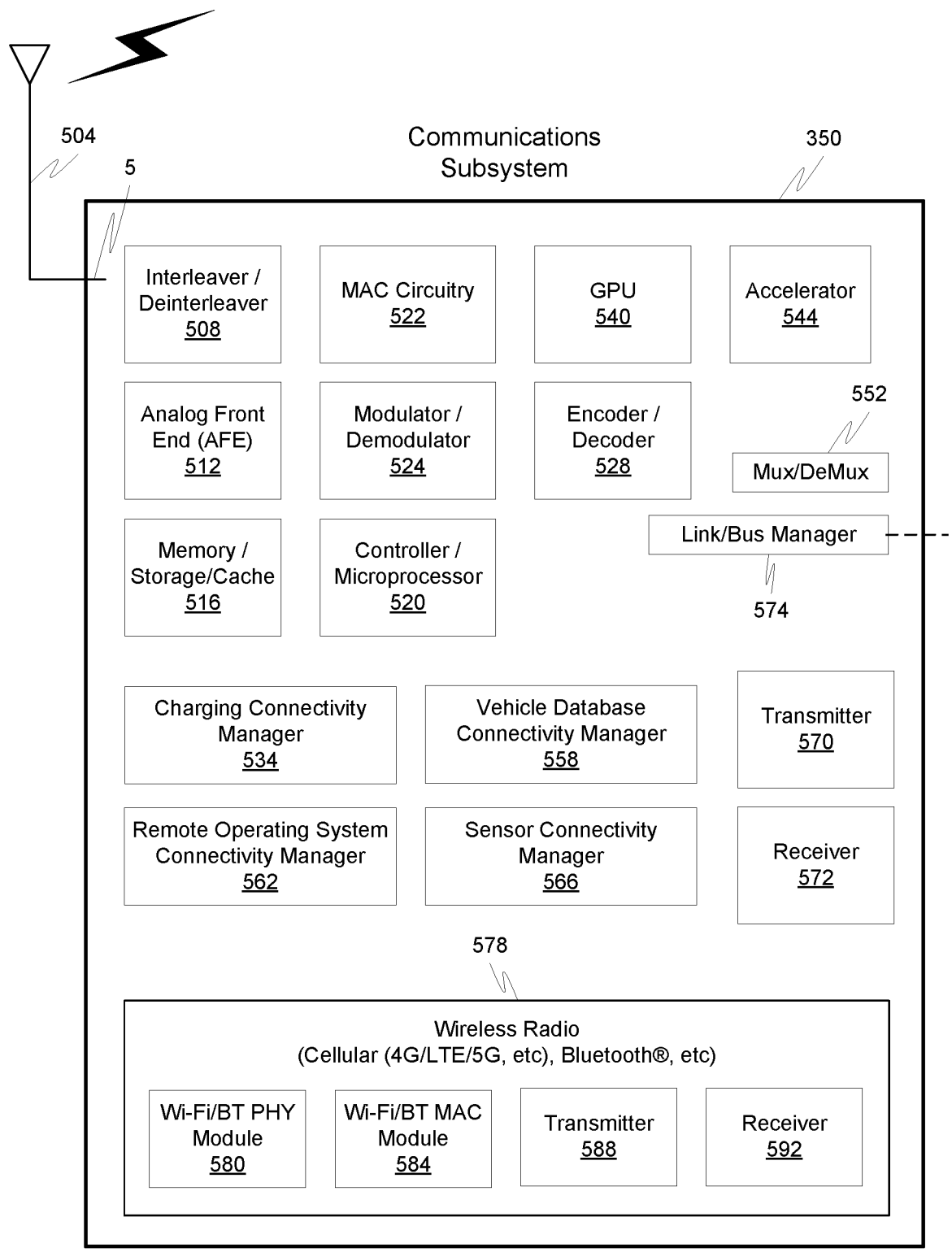
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications. Additionally, and while not specifically illustrated, the communications subsystem 350 can include one or more communications links (that can be wired or wireless) and/or communications busses (managed by the link/bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), DSRC, V2V, V2I, and the like or, in general, any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

In accordance with embodiments of the present disclosure, the network topology may be fixed such that one or more vehicle modules use a first network and/or a first network protocol, such as an Ethernet network, to exchange data between various system components within each module. For safety-critical messages and/or information, a second fault-tolerant backup network and/or a dedicated second network and/or second network protocol may be utilized to ensure that the safety-critical messages arrive at their destinations. By using a disparate network and/or network protocol, a system-wide fault affecting one network and/or network protocol would not impair the other network and/or network protocol.

In accordance with embodiments of the present disclosure, during normal operation, the link/bus manager 574 may configure one or more vehicle modules to use a first network and/or a first network protocol, such as an Ethernet network, to exchange data between various system components within each module. For safety-critical messages and/or information, the link/bus manager 574 may utilize a second fault-tolerant backup network and/or a dedicated second network and/or second network protocol to ensure that the safety-critical messages arrive at their destinations without additional latency. By using a disparate network and/or network protocol, a system-wide fault affecting one network and/or network protocol would not impair the other network and/or network protocol. Alternatively, or in addition, and in accordance with embodiments of the present disclosure, the link/bus manager 574 may provide a means to switch routing of information, such as safety-critical information and/or messages, such that a communication pathway having a reduced amount of network congestion and/or a greatest transmission speed and/or highest throughput may be utilized to route such information. Additional details are provided with respect to FIGS. 6-13.

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the communication system 350 are connected by one or more links/busses 5 (not shown, again for sake of clarity).

The communication system 350 can have one or more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), DSRC, V2V, V2I etc., and in general for any type of wireless communications. The antenna(s) 504 can include, but are not limited to, one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users, for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516, which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 516 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding, but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem 350 to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentiality restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed. In accordance with embodiments of the present disclosure, the sensor connectivity manager 566 may utilize one or more disparate communication networks and/or protocols to ensure that safety-critical sensor information is sent to and/or received by one or more modules requiring such safety-critical information. That is, as will be described with respect to FIG. 6, safety-critical information provided one or more vehicle sensors may be sent utilizing a redundant and/or dedicated network communication pathway and/or protocol.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem 350 can also optionally manage one or more identifiers, such as an IP (Internet protocol) address(es), associated with the vehicle and one or more other systems or subsystems or components therein. These identifiers can be used in conjunction with any one or more of the connectivity managers as discussed herein.

Figure 6:
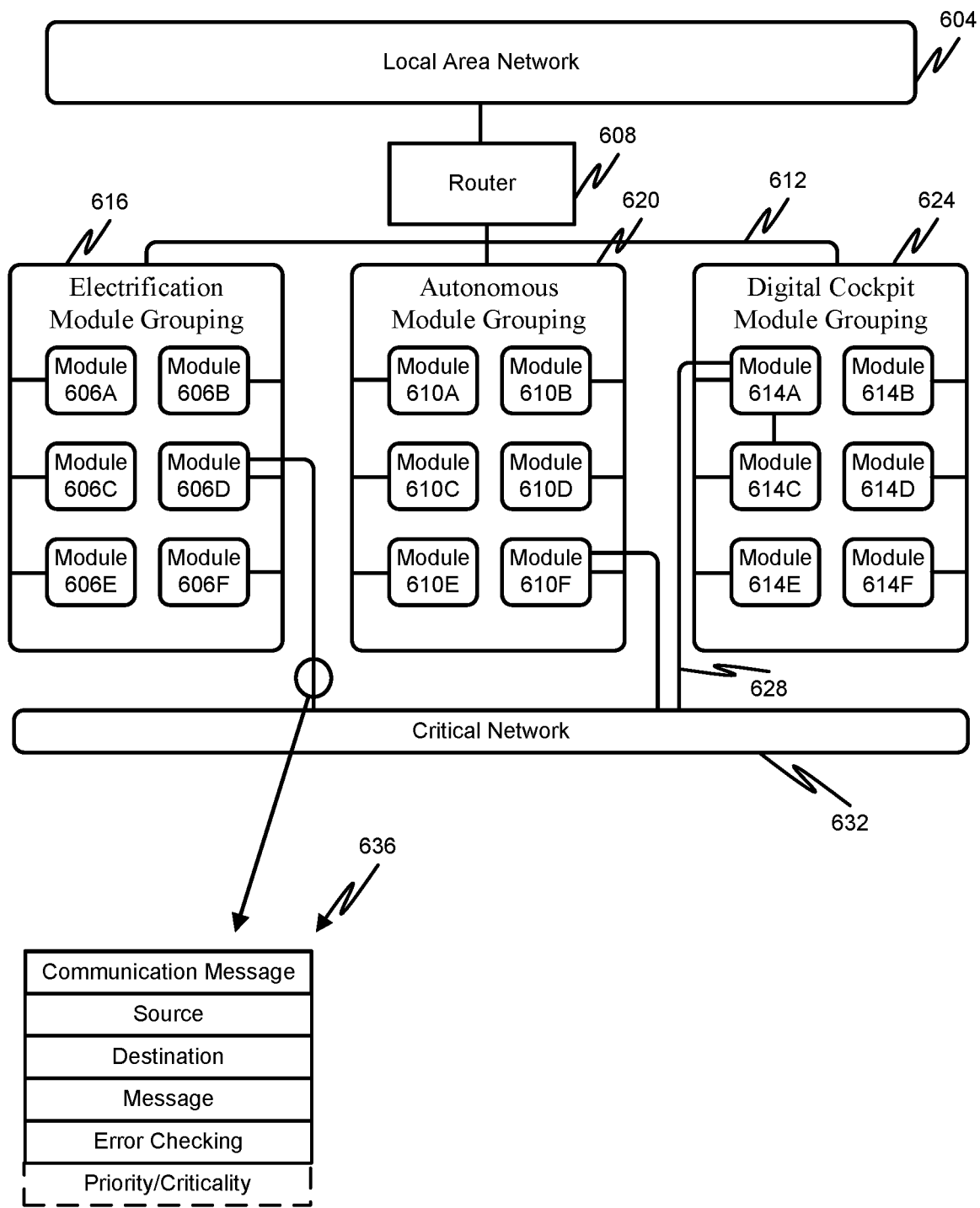
FIG. 6 is a first block diagram of first and second communication networks associated with the embodiments presented herein.

FIG. 6 illustrates a block diagram representing communications between modules and one or more communication networks, pathways, and/or protocols. More specifically, modules 606A-606F of an electrification module grouping 616, modules 610A-610F of an autonomous module grouping 620, and modules 614A-614F of a digital cockpit module grouping 624 are depicted in accordance with embodiments of the present disclosure. Each of the electrification module grouping 616, autonomous module grouping 620, and digital cockpit module grouping 624 may correspond to a respective electrification Ethernet subnet, an autonomous Ethernet subnet, and a digital cockpit Ethernet subnet. Alternatively, or in addition, each grouping may be grouped according to one or more networks, protocols, and the like. Moreover, the electrification module grouping 616, autonomous module grouping 620, and digital cockpit module grouping 624 are illustrated for example purposes; it should be understood that more or fewer groupings may be implemented.

As further depicted in FIG. 6, each of the modules 606A-606F within the electrification module grouping 616, modules 610A-610F in the autonomous module grouping 620, and modules 614A-614F in the digital cockpit module grouping 624 may communicate with a router 608 coupled to a local area network 604. Thus, each of the modules 606A-606F within the electrification module grouping 616, modules 610A-610F in the autonomous module grouping 620, and modules 614A-614F in the digital cockpit module grouping 624 may communicate with one another and/or modules and/or sensors not illustrated utilizing a first network, such as the local area network 604.

In accordance with embodiments of the present disclosure, the one or more of the modules 606A-606F within the electrification module grouping 616, modules 610A-610F in the autonomous module grouping 620, and modules 614A-614F in the digital cockpit module grouping 624 may further communicate with one another utilizing a second communication pathway, such as a fault-tolerant backup network depicted as the critical network 632, to ensure that safety-critical messages arrive at their destinations without additional latency. Further, by utilizing such a critical network 632, the possibility that inter-vehicle routing devices, such as the router 608 for example, may be a fault choke-point is minimized. Thus, by using a disparate network protocol and/or network segment, CAN versus Ethernet for example, a system-wide fault on the local area network 604 including the router 608 and the network segments 612, would not impair the critical network 632. As further illustrated in FIG. 6, one or more communication messages 636 are depicted. Each message may include one or more of a source identifier, such as an address, a destination identifier, such as an address, the information to communicate (message), and appropriate error checking. In some instances, the communication message 636 may include priority and/or criticality information. As will be discussed later, the priority and/or criticality information may be utilized to route a particular message over a particular communication pathway.

The critical network 632 may be a physically separate network and/or rely on a separate communication protocol. In some instances, multiple modules may share a critical network. In other instances, a module may communicate with another module utilizing a point to point communication pathway such that no router or other network elements are involved in communicating a message. Both a critical network 632 and a point to point communication pathway reduce an amount of message collisions, to zero in some instances, and further reduce latency associated with communicating a message.

Figure 7:
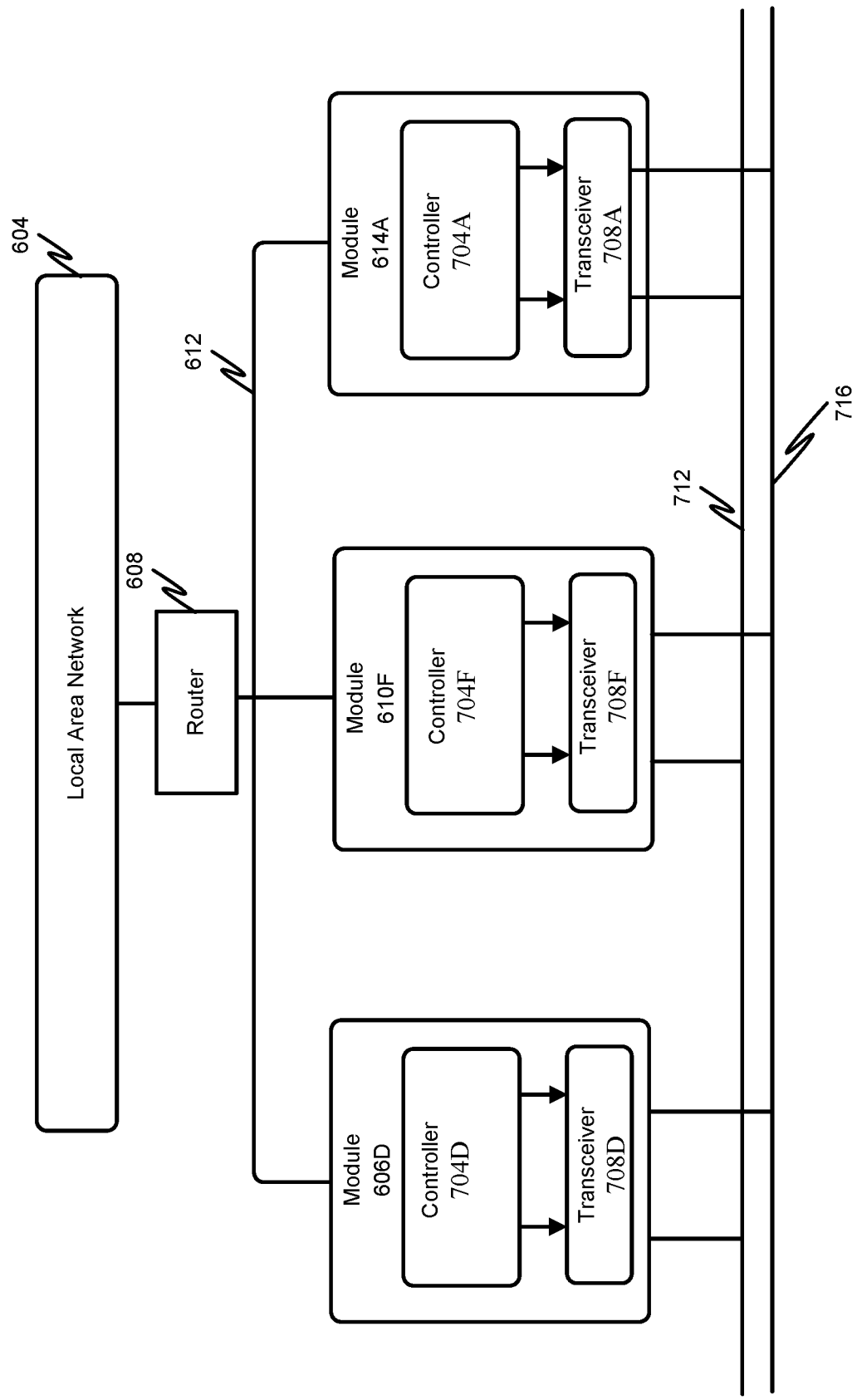
FIG. 7 depicts additional details of the first block diagram associated with one or more components described herein.

FIG. 7 depicts additional details of a block diagram representing communications between modules and one or more communication networks, pathways, and/or protocols. More specifically, one or more of the modules depicted in FIG. 6 may include a controller 704D, 704F, 704A and a transceiver 708D, 708F, 708A as depicted in FIG. 7. The controller may store signals received from a bus 712/716 for example, until an entire message is available. Moreover, the controller 704D, 704F, 704A may cause information to be transmitted on the bus 712/716 when the bus is free. More specifically, the transceiver 708D, 708F, 708A may convert a data stream from signal levels on the bus 712/716 to signal levels that the controller 704D, 704F, and 704A, uses. In instances where the transceiver 708D, 708F, 708A is transmitting information, the transceiver 708D, 708F, 708A may converter a data stream from the controller 704D, 704F, 704A to signal levels utilized by the bus 712/716. As further depicted, each module 606, 610, and 614 may be communicatively coupled to the local area network 604 through the previously described network segments 612 and router 608. Bus 712/716, represented as a two-wire bus, may include more or less wires.

Each module 606, 610, 614 for example, may be dual ported. That is each module may specifically include a port for communicating via the local area network 604 and a port for communicating via the critical network 632 and/or critical network bus 712/716. In other instances, only modules requiring access to the critical network may have the specific port for communicating. Alternatively, or in addition, a module may include only a single port for the preferred communication method. For example, module 606A may only include a signal port for communicating via the local area network 604 and communication pathway 612. In other instances, if module 606A were to need access to communicate via the critical network 632, the module 606A may have a second communication port.

Figure 8:
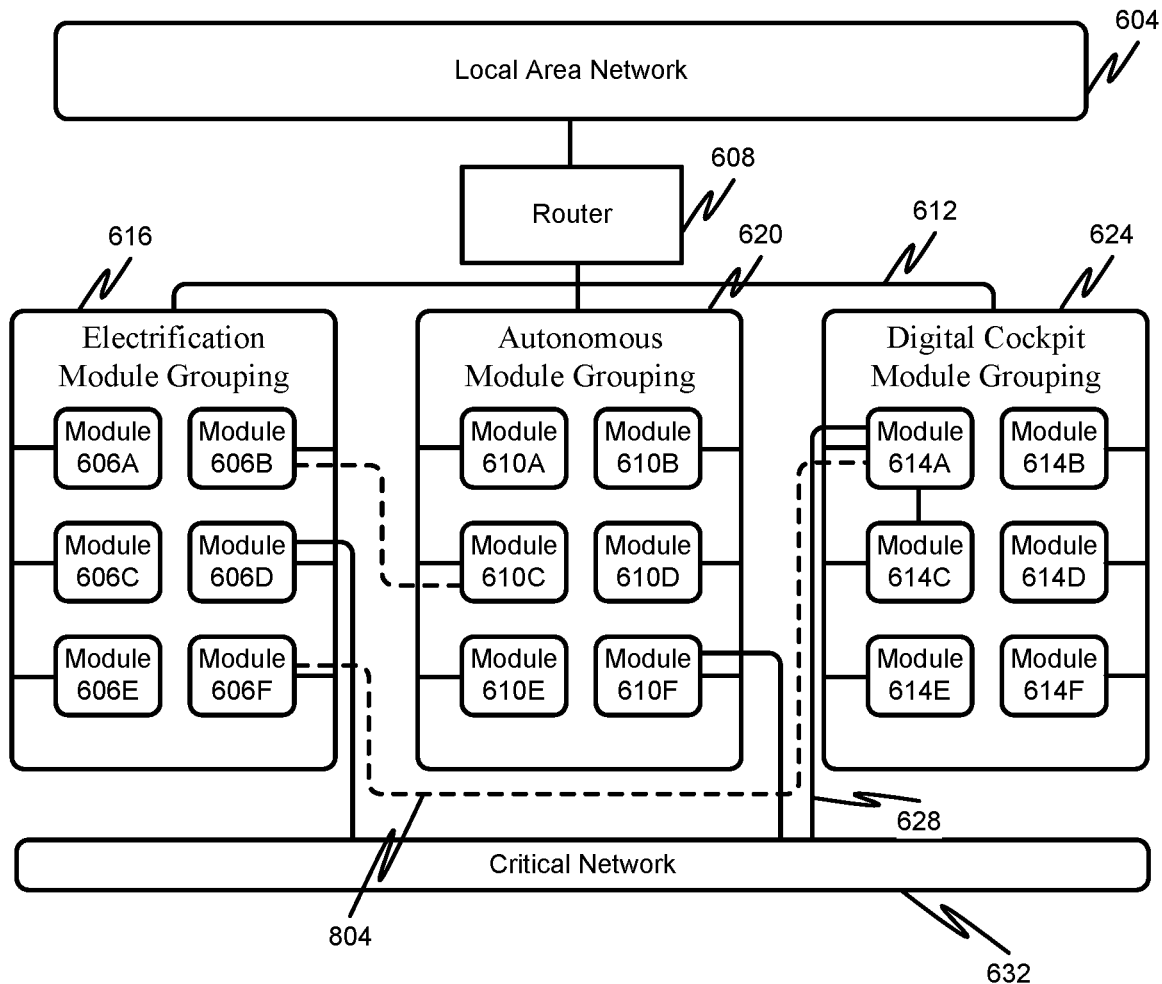
FIG. 8 is a second block diagram of first and second communication networks associated with the embodiments presented herein.

FIG. 8 depicts additional details of a block diagram representing communications between modules and one or more communication networks, pathways, and/or protocols. More specifically, one or more modules 606, 610, and/or 614 may be directly coupled and/or directly connected to one or more other modules 606, 610, and/or 614 via the communication pathway 804. Thus, for instance, the module 606B, for example, may be directly coupled and/or directly connected to the module 614A. Thus, communications between module 614A and module 606B, for example, may bypass the critical network 632. In some instances, both module 614A and module 606B may be connected or otherwise coupled to the local area network 604.

In accordance with embodiments of the present disclosure, a module may be coupled to the critical network 632, the local area network 604, and/or directly to another module, such as module 606F. For example, module 614A is coupled to the critical network 632 via a communication pathway 628, to the local area network 604 via a communication pathway 612, and to the module 606F via the communication pathway 804. In accordance with embodiments of the present disclosure, choosing a communication pathway may depend on a criticality and/or priority of a communication message. In accordance with embodiments of the present disclosure, a communication pathway, although available, may only be used in a last resort and/or emergency situation.

Each module 606, 610, 614 for example, may be triple ported. That is each module may specifically include a port for communicating via the local area network 604, a port for communicating via the critical network 632 and/or critical network bus 712/716, and a port for communicating via a direct, point to point, communication pathway 804 for example. In other instances, only modules requiring access to the critical network or other communication pathway may have the specific port for communicating. Alternatively, or in addition, a module may include only a single port for the preferred communication method. For example, module 606A may only include a signal port for communicating via the local area network 604 and communication pathway 612. In other instances, if module 606A were to communicate via the critical network 632, the module 606A may have a second communication port.

Figure 9:
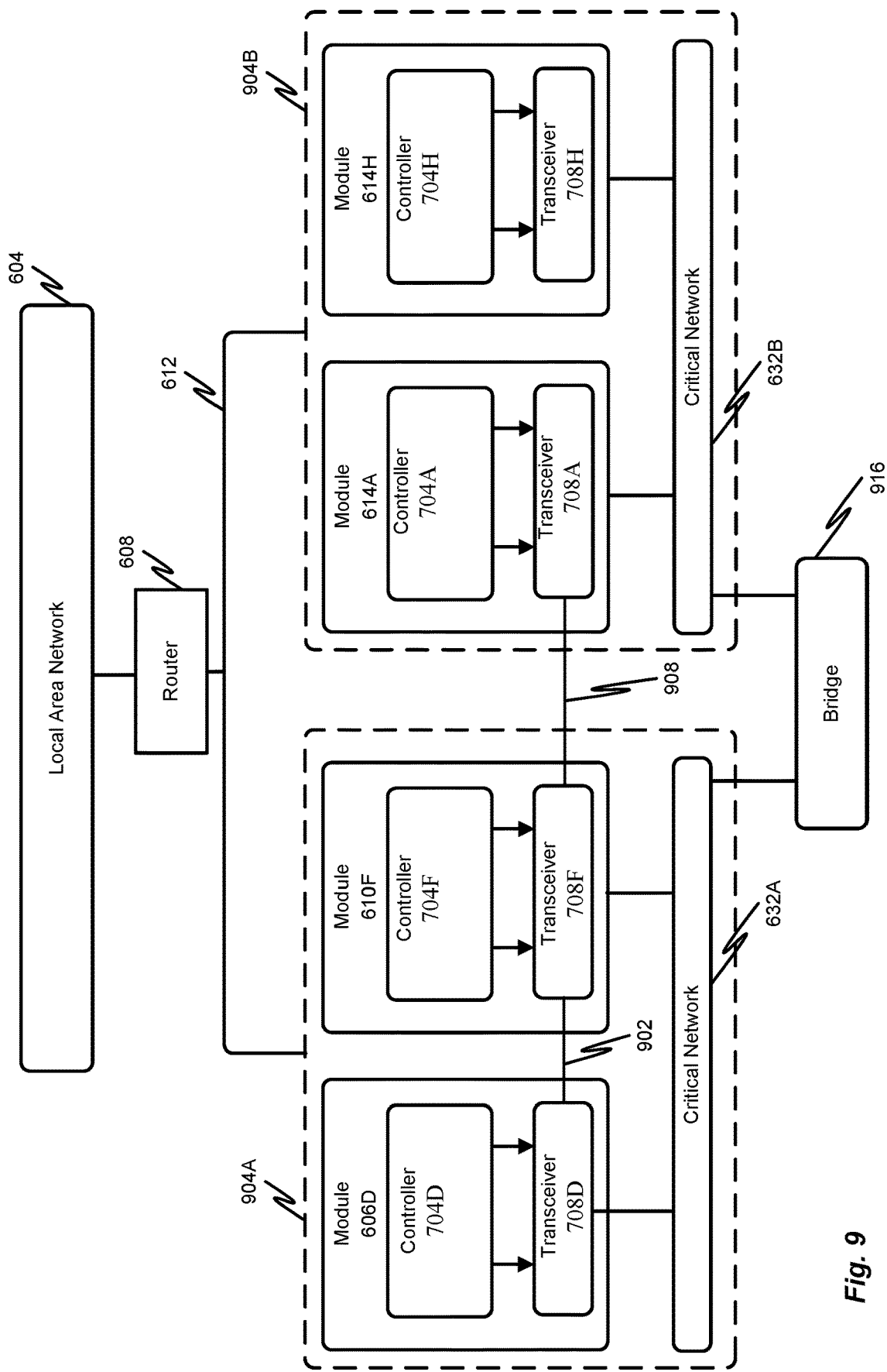
FIG. 9 is a third block diagram of first and second communication networks associated with the embodiments presented herein.

FIG. 9 depicts additional details of a block diagram representing communications between modules and one or more communication networks, pathways, and/or protocols in accordance with embodiments of the present disclosure. That is, FIG. 9 differs from FIGS. 6-8 in that two or more critical networks 632A and 632B may exist, where a critical network, 632A for example, facilitates communication within one or more groupings of modules 904A. In accordance with at least one embodiment of the present disclosure, the critical network 632A may facilitate communication between modules 606D and 610F of the groupings of modules 904A, whereas the critical network 632B may facilitate communication between modules 614A and 614H of the groupings of modules 904B, for example. Each module may include at least one transceiver 708 coupling the module to a critical network 632 as previously discussed. In instances where a module from one grouping, such as 904B, communicates with a module from another grouping 904A, utilizing a critical network 632B, a bridge 916 may facilitate communication between disparate critical networks 632A/632B.

In accordance with embodiments of the present disclosure, a module 606 may communicate with a module 610 directly through a communication pathway 902. Alternatively, or in addition, the module 606 may communication with the module 610 via the critical network 632A. Alternatively, or in addition, the module 606 may communication with the module 610 via the local area network 604.

Figure 10:
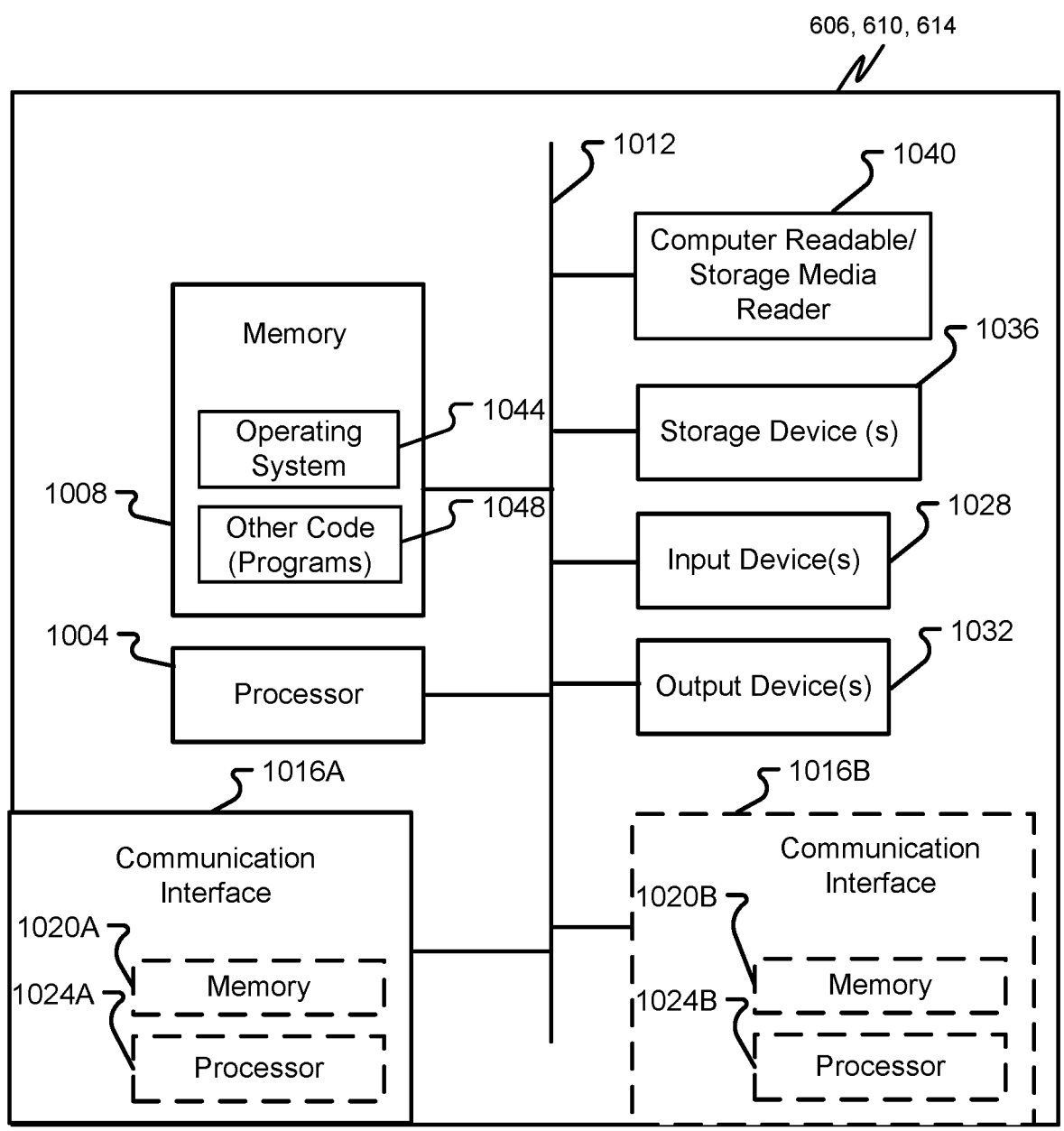
FIG. 10 is a block diagram of a device/module associated with one or more components described herein.

FIG. 10 depicts additional details of a module 606, 610, 614 for example. The module may include a processor 1004 communicatively coupled to a memory 1008 via a bus 1012. Each module 606, 610, 614 may further include at least one communication interface, such as communication interface 1016A for example. The communication interface may also be known as the previously described communication port. Each communication interface may include one or more of a memory 1020A and/or one or more of a processor 1024A. Alternatively, or in addition, the memory 1008 and/or processor 1004 may be shared with the communication interface 1016A. In accordance with at least one embodiment of the present disclosure, the communication interface 1016A may provide communications to a first network type, for example, a network utilizing an Ethernet protocol. In accordance with embodiments of the present disclosure, the module 606, 610, 614 may include a second communication interface 1016B. The communication interface 1016B may also include a dedicated memory 1020B and/or a dedicated processor 1024B. Alternatively, or in addition, the memory 1008 and/or processor 1004 may be shared with the communication interface 1016B and the communication interface 1016A. In accordance with at least one embodiment of the present disclosure, the communication interface 1016B may provide communications to a second network type, for example, a network utilizing a CANbus protocol. Alternatively, or in addition, the communication interface 1016B may provide communications to a second network type, for example, a point to point communication network, where the communication interface 1016B is directly connected to a communication interface 1016 of another module 606, 610, 614.

Additional hardware elements of a module 606, 610, 614 may include one or more input devices 1028 (e.g., a mouse, a keyboard, etc.), one or more output devices 1032 (e.g., a display device, a printer, etc.), one or more storage devices 1036, for example, disk drives, optical storage devices, solid-state storage devices such as a random access memory ("RAM") and/or a read-only memory ("ROM"), which can be programmable, flash-updateable and/or the like. The module 606, 610, 614 may additionally include a computer-readable storage media reader 1040. The memory 1008 may include RAM and ROM devices as described above. The module 606, 610, 614 may also comprise software elements, shown as being currently located within a working memory 1008, including an operating system 1044 and/or other code 1048. It should be appreciated that alternate embodiments of the module 606, 610, 614 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1004, as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 11:
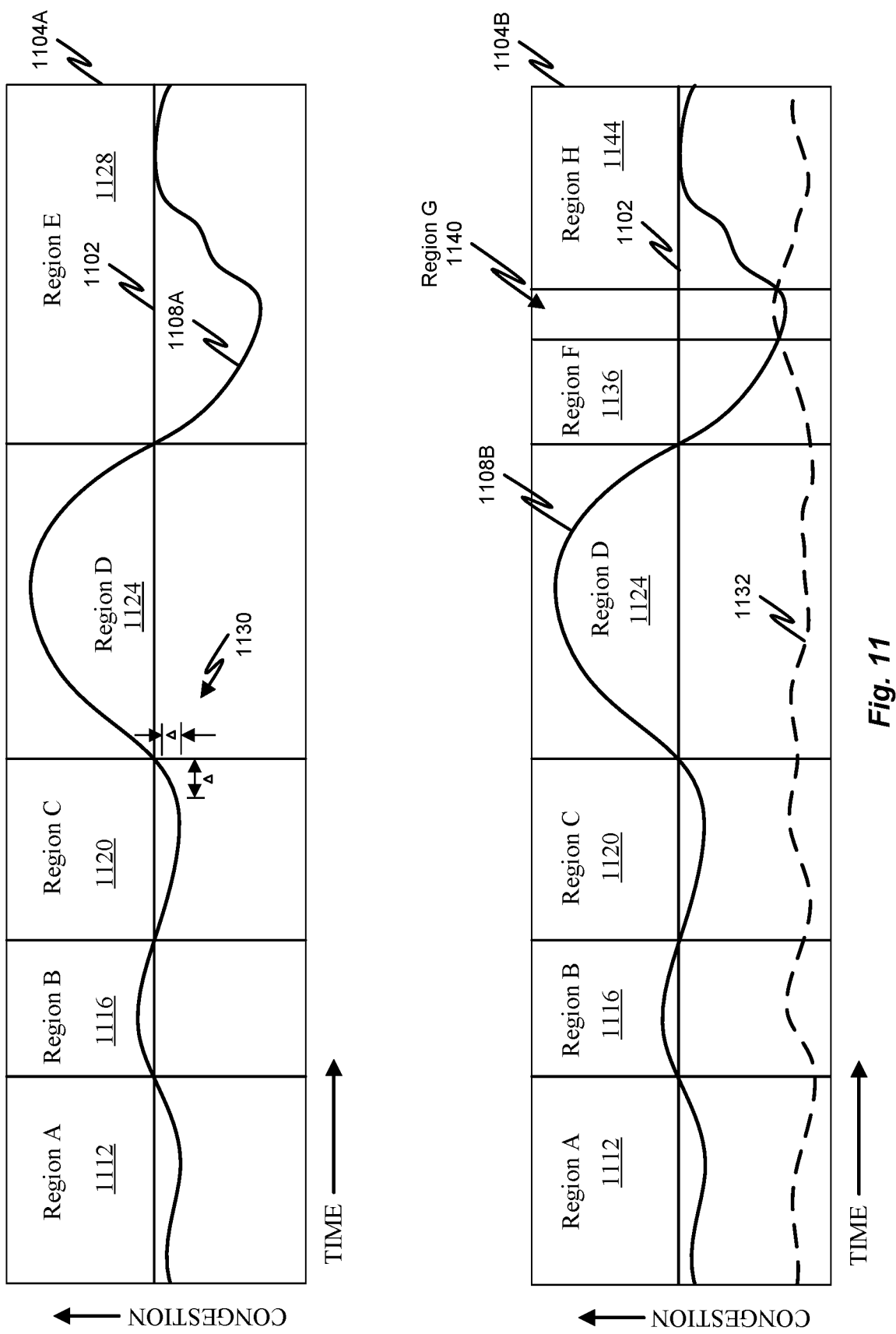
FIG. 11 is a diagram depicting details associated with network congestion and network congestion measurement in accordance with embodiments of the present disclosure.

FIG. 11 depicts additional details related to network congestion over time and a possible selection of a communication pathway and/or network in accordance with embodiments of the present disclosure. That is, a first congestion diagram 1104A depicts a measure of congestion, such as latency, collisions, packet loss, round-trip-time, etc. Typical effects of network congestion include queueing delay, packet loss or the blocking of new connections. In a Region A 1112, the measured congestion 1108A may be below a threshold 1102, thus a first type of network and/or network protocol is utilized, such as an Ethernet network. In a Region B 1116, the measured congestion 1108A may be above the threshold 1102 such that a second type of network and/or network protocol is utilized, such as a CANbus network. In a Region C 1120, the measured congestion 1108A may be below a threshold 1102, thus the first type of network and/or network protocol is utilized, such as the Ethernet network. In a Region D 1124, the measured congestion 1108A may be above the threshold 1102 such that the second type of network and/or network protocol is utilized, such as the CANbus network. In a Region E 1128, the measured congestion 1108A may be above the threshold 1102 such that the second type of network and/or network protocol is utilized, such as the CANbus network. Alternatively, or in addition, the selection of a communication pathway and/or network may be based on a change in the measured network congestion 1108A. For example, the amount of network congestion may increase quickly as measured over time at 1130; accordingly, at 1130, a selection of a network or communication pathway may switch from a first type to a second type. Similarly, if the measured amount of network congestion decreases above a certain rate, the selection of a network or communication pathway may switch from a second type to the first type.

In accordance with embodiments of the present disclosure, the selection of a communication network and/or pathway may be based on a measure of network congestion at two or more communication networks and/or pathways. For example, as illustrated in the second congestion diagram 1104B, a measured amount of network congestion 1108B is depicted over time as is a measured amount of network congestion 1132 for a separate disparate network and/or communication pathway. At Region F 1136, the measured amount of network congestion 1132 and 1108B become equal, such that at Region G 1140 the measured amount of network congestion 1132 is greater than 1108B. Thus, the selection of a network or communication pathway may switch from a first type to the second type. Similarly, at Region H 1144, the measured amount of network congestion 1132 is less than 1108B. Thus, the selection of a network or communication pathway may switch form a second type to the first type. In accordance with at least one embodiment of the present disclosure, based on a measured amount of network congestion, a network parameter may be adjusted, such as an amount of retransmissions or the like in order to reduce network congestion and decrease potential communication message latency.

Figure 12:
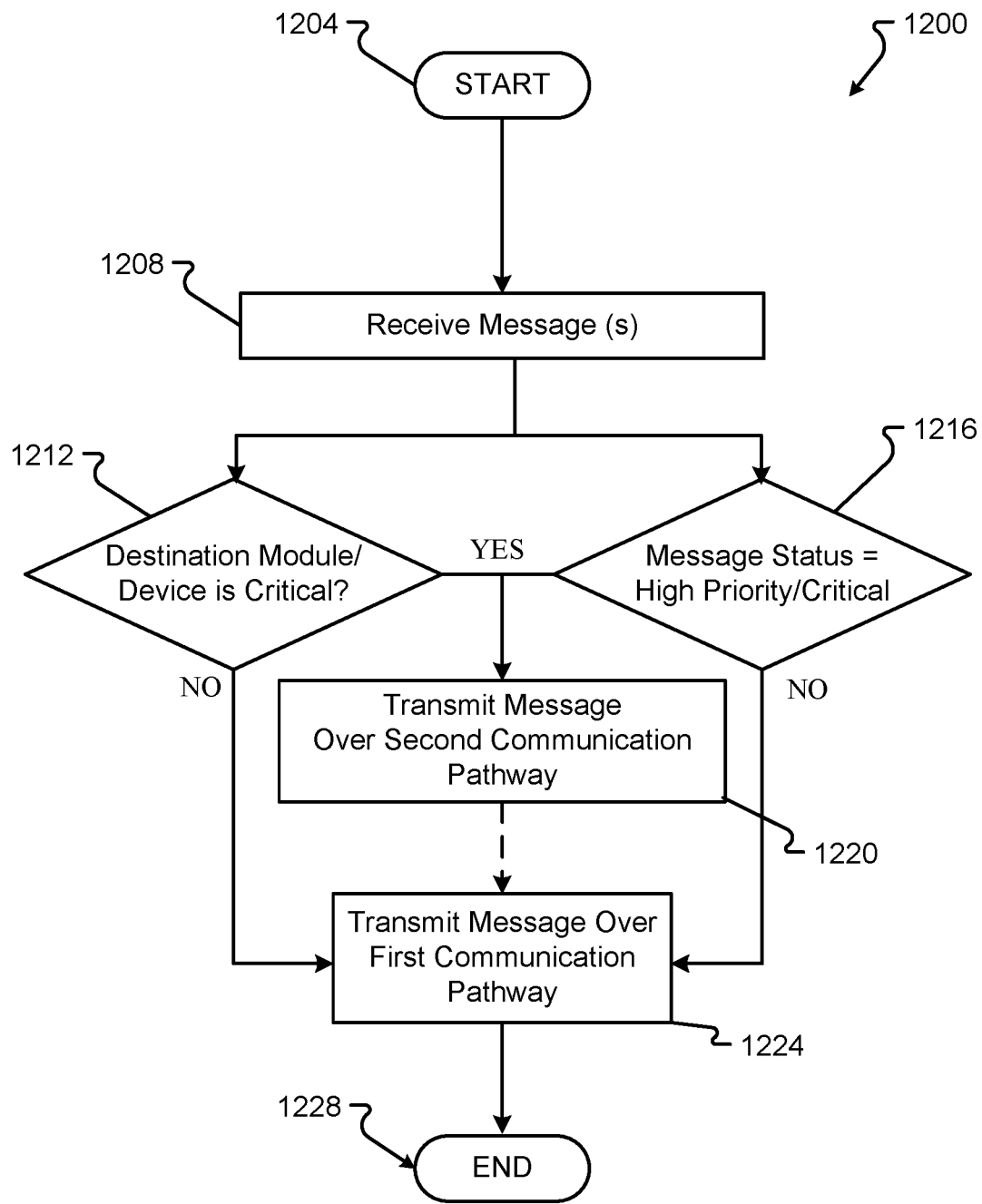
FIG. 12 is a first flow diagram of an embodiment of a method for transmitting a communication message over a first or second communication network in accordance with embodiments of the present disclosure.

An embodiment of a method 1200 for determining a network and/or communication pathway is illustrated in FIG. 12 in accordance with embodiments of the present disclosure. A general order for the steps of the method 1200 is shown in FIG. 12. Generally, the method 1200 starts with a start operation 1204 and ends with an end operation 1228. The method 1200 can include more or fewer steps or can arrange the order of the steps differently than those shown in FIG. 12. The method 1200 can be executed as a set of computer-executable instructions executed by a computer system or processor and encoded or stored on a computer readable medium. In other configurations, the method 1200 may be executed by a series of components, circuits, gates, etc. created in a hardware device, such as a System of Chip (SOC), Application Specific Integrated Circuit (ASIC), and/r a Field Programmable Gate Array (FPGA). Hereinafter, the method 1200 shall be explained with reference to the systems, components, circuits, modules, software, data structures, signaling processes, models, environments, vehicles, etc. described in conjunction with FIGS. 1-11.

In step 1208, a message, such as a message 636 may be received. At step 1212, the method 1200 may determine whether or not the destination module/device is a critical destination module and/or device. If the destination module and/or device is determined to be critical, the method 1200 proceeds to step 1220, where the message may be transmitted over a second communication pathway or network, such as a critical network 632. In some instances, the message may also be transmitted over the first communication network and/or path, such as the local area network 604 in addition to being transmitted over the second communication pathway or network, such as the critical network 632. In accordance with embodiments of the present disclosure, when the message is received at step 1208, the method 1200 may proceed to step 1216 where the priority and criticality of the message may be determined. In some instances, the criticality and/or priority of the message may be based on a quality of service tag, priority tag, criticality tag, and the like. If the message is determined to be critical and/or of high priority, the method 1200 may proceed to step 1220 where the message may be transmitted over a second communication pathway or network, such as a critical network 632. In some instances, the message may also be transmitted over the first communication network and/or path, such as the local area network 604 in addition to being transmitted over the second communication pathway or network, such as the critical network 632. In instances where the message is not determined to be of high priority and/or critical at step 1212 and 1216, the method 1200 may proceed to step 1224 where the message may be transmitted over the first communication network and/or path, such as the local area network 604. The method 1200 then ends at step 1228.

Figure 13:
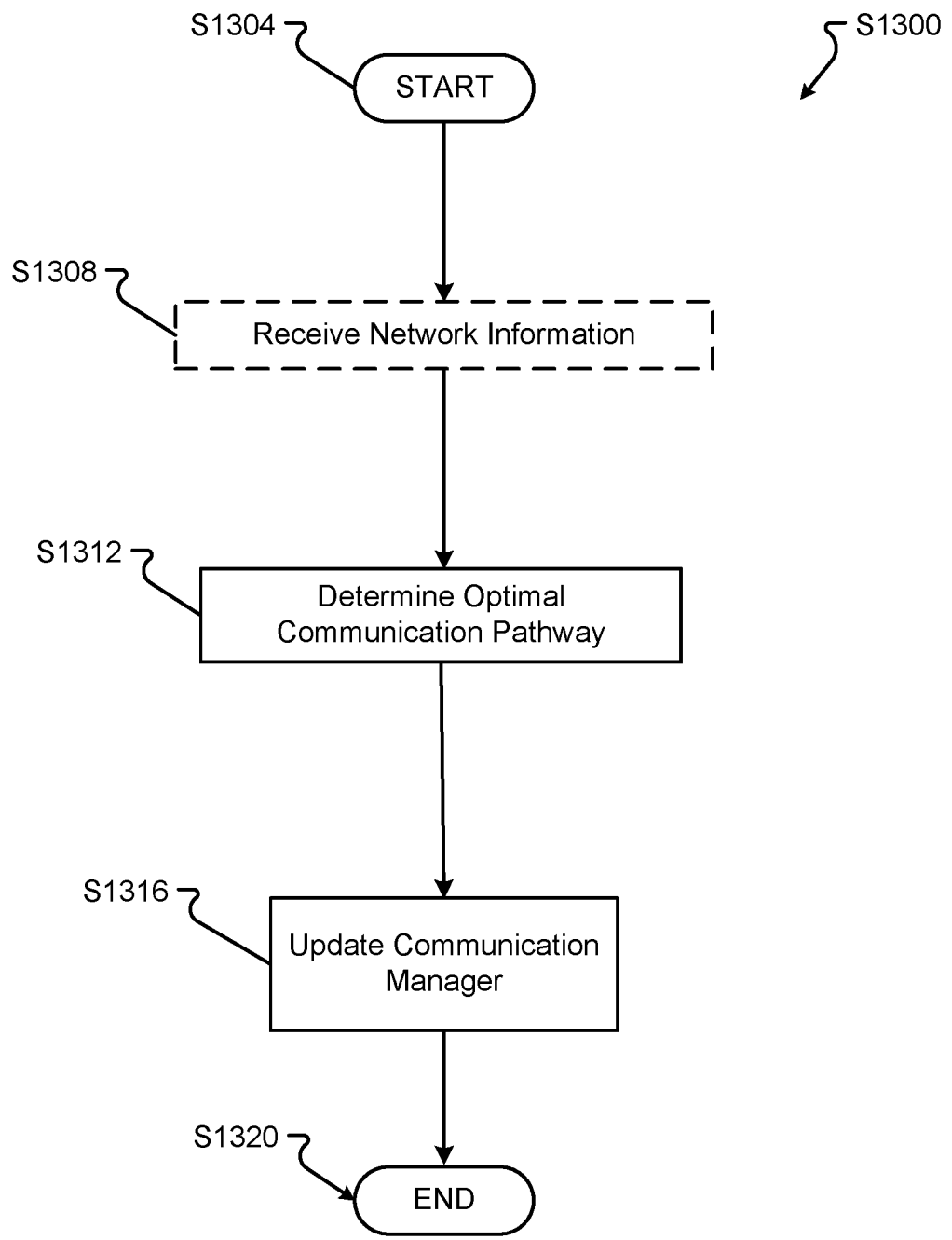
FIG. 13 is a second flow diagram of an embodiment of a method for determining an optimal communication pathway in accordance with embodiments of the present disclosure.

An embodiment of a method 1300 for determining an optimal network and/or communication pathway is illustrated in FIG. 13 in accordance with embodiments of the present disclosure. A general order for the steps of the method 1300 is shown in FIG. 13. Generally, the method 1300 starts with a start operation 1304 and ends with an end operation 1320. The method 1300 can include more or fewer steps or can arrange the order of the steps differently than those shown in FIG. 13. The method 1300 can be executed as a set of computer-executable instructions executed by a computer system or processor and encoded or stored on a computer readable medium. In other configurations, the method 1300 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1300 shall be explained with reference to the systems, components, circuits, modules, software, data structures, signaling processes, models, environments, vehicles, etc. described in conjunction with FIGS. 1-12.

In step 1308, network information, such as a measured amount of network congestion 1108, is received. At step 1312, an optical communication pathway may be determined based on the measured amount of network congestion as described with respect to FIG. 11. Alternatively, or in addition, the optical communication pathway may be determined based on message criticality and/or priority as described with respect to FIG. 12. At step 1316, a communication manager may be updated. That is, a communication manager, such as a link/bus manager 574 may be updated with the optimal communication pathway such that the optimal communication pathway is stored for a particular communication between modules 606, 610, 614. A message, such as a message 636 may be received.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle including a first plurality of devices associated with a first vehicle function, a second plurality of devices associated with a second vehicle function, and a first communication network communicatively coupling each of the first plurality of devices to each other, communicatively coupling each of the second plurality of devices to each other, and communicatively coupling the first plurality of devices to the second plurality of devices. The vehicle may also include a second communication network communicatively coupling less than all of the first plurality of devices to less than all of the second plurality of devices. Accordingly, the second communication network transmits messages determined to be critical from a first device of the first plurality of devices to a first device of the second plurality of devices.

Aspects of the above vehicle include where the first device of the first plurality of devices includes a first communication interface coupled to the first communication network and a second communication interface coupled to the second communication network, and wherein the first device of the second plurality of devices includes a first communication interface coupled to the first communication network and a second communication interface coupled to the second communication network. Aspects of the above vehicle include where the second communication network is a communication pathway directly connecting the second communication interface of the first device of the first plurality of devices to the second communication interface of the first device of the second plurality of devices. Aspects of the above vehicle include where communication via the first communication network is in accordance with an Ethernet protocol and communication via the second communication network is in accordance with a controller area network protocol. Aspects of the above vehicle include a communication manager that determines if a first communication message is a critical message and routes the first communication message determined to be critical over the second communication network. Aspects of the above vehicle include where the communication manager determines if a second communication message is a non-critical message and routes the second communication message determined to be non-critical over the first communication network. Aspects of the above vehicle include where at least one communication message is routed over both the first and second communication networks. Aspects of the above vehicle include a communication manager that determines whether a first communication message is routed over the first communication network and/or the second communication network.

Embodiments include a method including determining if a communication message originating from a device associated with a first vehicle function is to be routed over a first communication network or a second communication network, and routing the communication message over the second communication network when the communication message is determined to be critical. Accordingly, the first communication network communicatively couples each of a first plurality of devices to each other, communicatively couples each of a second plurality of devices to each other, and communicatively couples the first plurality of devices to the second plurality of devices, and the second communication network communicatively coupling less than all of the first plurality of devices to less than all of the second plurality of devices.

Aspects of the above method include where the first device of the first plurality of devices includes a first communication interface coupled to the first communication network and a second communication interface coupled to the second communication network, and wherein the first device of the second plurality of devices includes a first communication interface coupled to the first communication network and a second communication interface coupled to the second communication network. Aspects of the above method include where the second communication network is a communication pathway directly connecting the second communication interface of the first device of the first plurality of devices to the second communication interface of the first device of the second plurality of devices. Aspects of the above method include where communication via the first communication network is in accordance with an Ethernet protocol and communication via the second communication network is in accordance with a controller area network protocol. Aspects of the above method include where the communication message is determined to be critical if the communication message originates from a critical device. Aspects of the above method include measuring an amount of network congestion associated with the first communication network, and routing the communication message determined to be critical over the second communication network when the amount of network congestion associated with the first communication network is greater than an amount of congestion associated with the second communication message. Aspects of the above method include updating a communication manager with a desired communication network based on the amount of network congestion and the second communication network.

Embodiments include a non-transitory information storage media having stored thereon one or more instructions, that when executed by one or more processors, cause a processor to perform a method, the method comprising determining if a communication message originating from a device associated with a first vehicle function is to be routed over a first communication network or a second communication network, wherein the first communication network communicatively couples each of a first plurality of devices to each other, communicatively couples each of a second plurality of devices to each other, and communicatively couples the first plurality of devices to the second plurality of devices, and the second communication network communicatively coupling less than all of the first plurality of devices to less than all of the second plurality of devices, and routing the communication message over the second communication network when the communication message is determined to be critical.

Aspects of the above method include measuring an amount of network congestion associated with the first communication network, and routing the communication message determined to be critical over the second communication network when the amount of network congestion associated with the first communication network is greater than an amount of congestion associated with the second communication message. Aspects of the above method include updating a communication manager with a desired communication network based on the amount of network congestion associated with the first communication network and the second communication network. Aspects of the above method include obtaining route information from the communication manager, and transmitting the communication message over the first or second communication message based on the router information obtained from the communication manager.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
    a first plurality of devices associated with a first vehicle function;
    a second plurality of devices associated with a second vehicle function;
    a first communication network communicatively coupling each of the first plurality of devices to each other, communicatively coupling each of the second plurality of devices to each other, and communicatively coupling the first plurality of devices to the second plurality of devices;
    a second communication network communicatively coupling less than all of the first plurality of devices to less than all of the second plurality of devices;
    a third communication network communicatively coupling the first plurality of devices to the second plurality of devices for point-to-point communication therebetween; and
    a communication manager that determines if a first communication message is a critical message and route the first communication message determined to be critical over the second communication network;
    wherein,
        the second communication network transmits messages determined to be critical from a first device of the first plurality of devices to a first device of the second plurality of devices;
        the first device of the first plurality of devices includes a first communication interface coupled to the first communication network and a second communication interface coupled to the second communication network;
        the first device of the second plurality of devices includes a first communication interface coupled to the first communication network and a second communication interface coupled to the second communication network;
        the second communication network is a communication pathway directly connecting the second communication interface of the first device of the first plurality of devices to the second communication interface of the first device of the second plurality of devices; and
        communication via the first communication network is in accordance with an Ethernet protocol, the communication via the second communication network is in accordance with a controller area network protocol, and the communication via the third communication network is in accordance with a wireless point-to-point network protocol.

2. The vehicle of claim 1, wherein the communication manager determines if a second communication message is a non-critical message and routes the second communication message determined to be non-critical over the first communication network.

3. The vehicle of claim 2, wherein at least one communication message is routed over both the first and second communication networks.

4. The vehicle of claim 1, further including a communication manager that determines whether a first communication message is routed over the first communication network and/or the second communication network.

5. A method, comprising:
   determining if a communication message originating from a device associated with a first vehicle function is to be routed over a first communication network or a second communication network; and
   routing the communication message over the second communication network when the communication message is determined to be critical;
   wherein,
      the first communication network communicatively couples each of a first plurality of devices to each other, communicatively couples each of a second plurality of devices to each other, and communicatively couples the first plurality of devices to the second plurality of devices;
      the second communication network communicatively couples less than all of the first plurality of devices to less than all of the second plurality of devices;
      a third communication network communicatively couples the first plurality of devices to the second plurality of devices for point-to-point communication therebetween;
      a first device of the first plurality of devices includes a first communication interface coupled to the first communication network and a second communication interface coupled to the second communication network;
      a first device of the second plurality of devices includes a first communication interface coupled to the first communication network and a second communication interface coupled to the second communication network;
      the second communication network is a communication pathway directly connecting the second communication interface of the first device of the first plurality of devices to the second communication interface of the first device of the second plurality of devices;
      the second communication network is a communication pathway directly connecting the second communication interface of the first device of the first plurality of devices to the second communication interface of the first device of the second plurality of devices; and
      communication via the first communication network is in accordance with an Ethernet protocol, communication via the second communication network is in accordance with a controller area network protocol, and communication via the third communication network is in accordance with a wireless point-to-point network.

6. The method of claim 5, wherein the communication message is determined to be critical if the communication message originates from a critical device.

7. The method of claim 5, further comprising:
   measuring an amount of network congestion associated with the first communication network; and
   routing the communication message determined to be critical over the second communication network upon determining the amount of network congestion associated with the first communication network is greater than an amount of congestion associated with the second communication message.

8. The method of claim 7, further comprising updating a communication manager with a desired communication network based on the amount of network congestion and the second communication network.

9. The method of claim 8, further comprising:
   obtaining route information from the communication manager; and
   transmitting the communication message over the first or second communication message based on the route information obtained from the communication manager.

10. A non-transitory information storage media having stored thereon one or more instructions, that when executed by one or more processors, cause a processor to perform a method, the method comprising:
   determining if a communication message originating from a device associated with a first vehicle function is to be routed over a first communication network or a second communication network, wherein the first communication network communicatively couples each of a first plurality of devices to each other, communicatively couples each of a second plurality of devices to each other, and communicatively couples the first plurality of devices to the second plurality of devices, and the second communication network communicatively coupling less than all of the first plurality of devices to less than all of the second plurality of devices; and
   routing the communication message over the second communication network when the communication message is determined to be critical;
   wherein,
      a third communication network communicatively couples the first plurality of devices to the second plurality of devices for point-to-point communication therebetween;
      a first device of the first plurality of devices includes a first communication interface coupled to the first communication network and a second communication interface coupled to the second communication network;
      a first device of the second plurality of devices includes a first communication interface coupled to the first communication network and a second communication interface coupled to the second communication network;
      the second communication network is a communication pathway directly connecting the second communication interface of the first device of the first plurality of devices to the second communication interface of the first device of the second plurality of devices;
      the second communication network is a communication pathway directly connecting the second communication interface of the first device of the first plurality of devices to the second communication interface of the first device of the second plurality of devices; and
      communication via the first communication network is in accordance with an Ethernet protocol, communication via the second communication network is in accordance with a controller area network protocol, and communication via the third communication network is in accordance with a wireless point-to-point network protocol.

11. The non-transitory information storage media of claim 10, further comprising:
   measuring an amount of network congestion associated with the first communication network; and routing the communication message determined to be critical over the second communication network when the amount of network congestion associated with the first communication network is greater than an amount of congestion associated with the second communication message.

12. The non-transitory information storage media of claim 11, further comprising updating a communication manager with a desired communication network based on the amount of network congestion associated with the first communication network and the second communication network.

13. The non-transitory information storage media of claim 12, further comprising
obtaining route information from the communication manager; and
transmitting the communication message over the first or second communication message based on the route information obtained from the communication manager.

* * * * *